United States Patent
Su et al.

(10) Patent No.: US 9,751,268 B2
(45) Date of Patent: *Sep. 5, 2017

(54) MOLDS AND METHOD OF USING THE SAME FOR OPTICAL LENSES

(71) Applicant: QSPEX TECHNOLOGIES, INC., Alpharetta, GA (US)

(72) Inventors: Kai Su, Alpharetta, GA (US); Debbie Makita, Lawrenceville, GA (US)

(73) Assignee: QSPEX TECHNOLOGIES, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,293

(22) Filed: Oct. 24, 2014

(65) Prior Publication Data

US 2015/0041999 A1    Feb. 12, 2015

Related U.S. Application Data

(60) Division of application No. 11/698,529, filed on Jan. 26, 2007, now Pat. No. 8,899,547, which is a (Continued)

(51) Int. Cl.
*B29D 11/00* (2006.01)
*B29C 33/30* (2006.01)
(Continued)

(52) U.S. Cl.
CPC ........ *B29D 11/00009* (2013.01); *B29C 33/30* (2013.01); *B29D 11/0048* (2013.01);
(Continued)

(58) Field of Classification Search
CPC .......... B29D 11/00009; B29D 11/0048; B29D 11/00442; B29C 33/30; B29C 33/40
See application file for complete search history.

(56) References Cited

U.S. PATENT DOCUMENTS 3,946,982 A    3/1976   Calkins et al.
4,095,772 A    6/1978   Weber
(Continued)

FOREIGN PATENT DOCUMENTS

EP    1226011    6/2011

OTHER PUBLICATIONS

International Search Report and Written Opinion mailed Apr. 11, 2006 for International Application No. PCT/US2005/041619 filed Nov. 16, 2005.

(Continued)

*Primary Examiner* — Mathieu Vargot
(74) *Attorney, Agent, or Firm* — Locke Lord LLP; Tim Tingkang Xia, Esq.

(57) ABSTRACT

The present invention encompasses, in part, a method and apparatus for lens casting in which two molds, preferably formed of plastic, are interconnected or joined together via a ring to form a mold cavity having substantially the same dimensions of the lens to be formed therein. The invention is further directed to compositions and methods used in lens casting. In a first implementation the invention includes a mold having a ring having an interior periphery; a front mold formed of a plastic and having a lens-forming surface, an edge circumscribing the lens-forming surface that is sized to be complementarily received within a portion of the interior periphery of the ring, and a base having dimensions greater than the interior periphery; and a rear mold formed of a plastic and having a lens-forming surface.

10 Claims, 4 Drawing Sheets

Related U.S. Application Data continuation-in-part of application No. 11/188,223, filed on Jul. 22, 2005, now Pat. No. 7,220,120, and a continuation-in-part of application No. 10/992,224, filed on Nov. 18, 2004.

(51) Int. Cl.
*B29C 33/40* (2006.01)
*B29K 101/12* (2006.01)
*B29K 105/00* (2006.01)

(52) U.S. Cl.
CPC ........ *B29D 11/00442* (2013.01); *B29C 33/40* (2013.01); *B29K 2101/12* (2013.01); *B29K 2105/0014* (2013.01); *B29K 2833/12* (2013.01); *B29K 2995/0039* (2013.01); *Y10S 425/808* (2013.01)

(56) References Cited

U.S. PATENT DOCUMENTS

| | | | |
|---|---|---|---|
| 4,159,292 A | 6/1979 | Neefe | |
| 4,284,399 A | 8/1981 | Newcomb et al. | |
| 4,338,269 A | 7/1982 | Russell | |
| 4,390,482 A | 6/1983 | Feurer | |
| 4,544,572 A | 10/1985 | Sandvig et al. | |
| 4,758,448 A | 7/1988 | Sandvig et al. | |
| 4,774,035 A | 9/1988 | Carmelite et al. | |
| 4,873,029 A | 10/1989 | Blum | |
| 4,919,850 A | 4/1990 | Blum et al. | |
| 4,954,591 A | 9/1990 | Belmares | |
| 4,955,580 A | 9/1990 | Seden et al. | |
| 5,036,971 A | 8/1991 | Seden et al. | |
| 5,049,321 A * | 9/1991 | Galic | 264/1.38 |
| 5,143,660 A | 9/1992 | Hamilton et al. | |
| 5,160,668 A | 11/1992 | Imus | |
| 5,246,728 A | 9/1993 | Rodriquez | |
| 5,254,000 A | 10/1993 | Friske et al. | |
| 5,260,001 A | 11/1993 | Nandu et al. | |
| 5,271,875 A * | 12/1993 | Appleton et al. | 264/2.3 |
| 5,458,820 A | 10/1995 | Lefebvre | |
| 5,524,419 A | 6/1996 | Shannon | |
| 5,551,663 A | 9/1996 | Bae et al. | |
| 5,621,017 A | 4/1997 | Kobayakawa et al. | |
| 5,639,510 A | 6/1997 | Kindt-Larsen et al. | |
| 5,681,510 A | 10/1997 | Valint, Jr. et al. | |
| 5,733,483 A | 3/1998 | Soane et al. | |
| 5,763,511 A | 6/1998 | Chan et al. | |
| 5,779,943 A | 7/1998 | Enns et al. | |
| 5,804,107 A | 9/1998 | Martin et al. | |
| 5,837,314 A | 11/1998 | Beaton et al. | |
| 5,922,249 A | 7/1999 | Ajello et al. | |
| 5,981,618 A | 11/1999 | Martin et al. | |
| 5,981,634 A | 11/1999 | Smith et al. | |
| 6,017,121 A | 1/2000 | Chateau et al. | |
| 6,068,464 A | 5/2000 | Su et al. | |
| 6,099,764 A | 8/2000 | Su et al. | |
| 6,103,148 A | 8/2000 | Su et al. | |
| 6,113,817 A | 9/2000 | Herbrechtsmeier et al. | |
| 6,114,437 A | 9/2000 | Brown et al. | |
| 6,162,844 A | 12/2000 | Lally et al. | |
| 6,171,525 B1 | 1/2001 | Effer et al. | |
| 6,177,507 B1 | 1/2001 | Calderada | |
| 6,201,037 B1 * | 3/2001 | Lipscomb et al. | 522/178 |
| 6,241,505 B1 | 6/2001 | Buazza et al. | |
| 6,328,446 B1 | 12/2001 | Bhalakia et al. | |
| 6,368,523 B1 | 4/2002 | Buazza et al. | |
| 6,478,990 B1 | 11/2002 | Powers et al. | |
| 6,486,226 B2 | 11/2002 | Al-Akhdar et al. | |
| 6,506,488 B1 | 1/2003 | Stewart et al. | |
| 6,531,076 B2 | 3/2003 | Crano et al. | |
| 6,551,531 B1 | 4/2003 | Ford et al. | |
| 6,565,776 B1 | 5/2003 | Li et al. | |
| 6,634,879 B2 | 10/2003 | Buazza et al. | |
| 6,712,596 B1 | 3/2004 | Buazza et al. | |
| 6,772,988 B2 | 8/2004 | Altmann | |
| 6,773,108 B2 | 8/2004 | deRojas et al. | |
| 6,776,934 B2 | 8/2004 | Lai | |
| 6,777,459 B2 | 8/2004 | Al-Akhdar et al. | |
| 6,780,546 B2 | 8/2004 | Trentler et al. | |
| 6,786,598 B2 | 9/2004 | Buazza | |
| 6,811,727 B2 | 11/2004 | Havens et al. | |
| 6,863,844 B2 | 3/2005 | Engardio et al. | |
| 6,869,549 B2 | 3/2005 | Ansell et al. | |
| 6,887,402 B2 | 5/2005 | Klemm et al. | |
| 6,890,458 B2 | 5/2005 | Weber et al. | |
| 6,939,899 B2 | 9/2005 | Buazza et al. | |
| 6,986,857 B2 | 1/2006 | Klemm et al. | |
| 7,087,698 B1 | 8/2006 | Okoroafor et al. | |
| 7,098,290 B1 | 8/2006 | Okoroafor et al. | |
| 7,169,941 B2 | 1/2007 | Nagoh et al. | |
| 7,189,456 B2 | 3/2007 | King | |
| 7,220,120 B2 * | 5/2007 | Su et al. | 425/256 |
| 7,247,262 B2 | 7/2007 | Evans et al. | |
| 7,261,843 B2 | 8/2007 | Knox et al. | |
| 7,335,702 B2 | 2/2008 | La Dous | |
| 7,410,691 B2 | 8/2008 | Blackburn et al. | |
| 7,439,278 B2 | 10/2008 | Jallouli | |
| 7,452,611 B2 | 11/2008 | Blackburn et al. | |
| 7,465,414 B2 | 12/2008 | Knox et al. | |
| 7,666,331 B2 | 2/2010 | King et al. | |
| 7,767,728 B2 | 8/2010 | Lu et al. | |
| 7,811,480 B2 | 10/2010 | King | |
| 7,854,863 B2 | 12/2010 | Drotleff et al. | |
| 7,884,992 B1 | 2/2011 | Wang et al. | |
| 7,961,372 B2 | 6/2011 | Kim et al. | |
| 8,133,274 B2 | 3/2012 | Zhou et al. | |
| 8,137,595 B2 | 3/2012 | Kim et al. | |
| 8,298,671 B2 | 10/2012 | Qin et al. | |
| 8,323,535 B2 | 12/2012 | Choi et al. | |
| 8,367,211 B2 | 2/2013 | Qin et al. | |
| 8,608,988 B2 | 12/2013 | Bowles et al. | |
| 2001/0038890 A1 * | 11/2001 | Buazza | B29D 11/00442 428/1.1 |
| 2001/0054774 A1 * | 12/2001 | Altmann | 264/1.36 |
| 2002/0163095 A1 | 11/2002 | Andino et al. | |
| 2003/0057578 A1 | 3/2003 | Haidl et al. | |
| 2003/0094714 A1 | 5/2003 | Buazza et al. | |
| 2003/0146527 A1 | 8/2003 | Powers et al. | |
| 2003/0152693 A1 | 8/2003 | Su et al. | |
| 2003/0164562 A1 | 9/2003 | Li et al. | |
| 2003/0183960 A1 | 10/2003 | Buazza et al. | |
| 2004/0000732 A1 | 1/2004 | Spaulding et al. | |
| 2004/0041287 A1 | 3/2004 | Engardio et al. | |
| 2004/0099971 A1 | 5/2004 | Su et al. | |
| 2004/0119174 A1 | 6/2004 | Hofmann et al. | |
| 2005/0068492 A1 | 3/2005 | Itoh et al. | |
| 2007/0173582 A1 | 7/2007 | Rukavina et al. | |
| 2008/0058444 A1 | 3/2008 | Tanaka et al. | |
| 2008/0146816 A1 | 6/2008 | Fabre-Francke et al. | |
| 2009/0093601 A1 | 4/2009 | Evans et al. | |
| 2011/0147681 A1 | 6/2011 | Evans et al. | |
| 2013/0015416 A1 | 1/2013 | Takenaka et al. | |
| 2013/0242368 A1 | 9/2013 | Ofir et al. | |
| 2013/0273380 A1 | 10/2013 | Hickenboth et al. | |

OTHER PUBLICATIONS

International Search Report and Written Opinion mailed Jun. 28, 2006 for International Application No. PCT/US2005/041915 filed Nov. 16, 2005.

* cited by examiner

MOLDS AND METHOD OF USING THE SAME FOR OPTICAL LENSES

CROSS-REFERENCE TO RELATED APPLICATIONS

This application is a divisional application of, and claims benefit of U.S. patent application Ser. No. 11/698,529, filed Jan. 26, 2007, now issued as U.S. Pat. No. 8,899,547, which itself is a Continuation-in-Part of U.S. application Ser. No. 11/188,223, filed Jul. 22, 2005, now issued as U.S. Pat. No. 7,220,120, and also is a Continuation-in-Part of U.S. application Ser. No. 10/992,224, filed Nov. 18, 2004, now abandoned. Each of the above-identified applications is hereby incorporated by reference in its entirety.

BACKGROUND OF THE INVENTION

Field of the Invention

The present invention encompasses, in part, a method and apparatus for lens casting in which two molds, preferably formed of plastic, are interconnected or joined together via a ring to form a mold cavity having substantially the same dimensions of the lens to be formed therein. The invention is further directed to compositions and methods used in lens casting.

Background

The art of casting lenses involves introducing a lens-forming material, such as a monomer or monomer mixture, into a volume and then polymerizing the lens-forming material to become a solid. The formed lens can be used for ophthalmic or specialty optics applications. Ophthalmic devices have traditionally been created by first forming a cavity out of two separate mold shapes, then filling that cavity with a liquid material that will cure and form a solid shape. The molds used in this type of process are typically glass or metal, based on their high chemical resistance and low amount of geometric distortion they experience over time.

Most commonly, two glass mold pieces and a gasket form the volume that defines the dimensions of the lens to be cast. Some prior art gaskets are known as "T-gaskets," which include a bore having two ends that each complementarily receives a respective glass mold spaced apart a predetermined axial distance from the other mold. Different T-gaskets are required to form varying power lenses because they only allow one separation distance between molds. Accordingly, manufacturers must maintain T-gaskets for a +2 lens, another for a −3 lens, still another for a −4 lens, etc.

An improvement of this "T-gasket" design is disclosed in U.S. Pat. No. 6,068,464 (hereafter "the '464 patent"), in which at least one of the two molds is slidably movable along the bore of the gasket. This design thus has a "universal" gasket that can be used to form different powers of lenses, whereas a given prior art T-gasket may be used to form one power of lens and a different T-gasket is used to form another power.

U.S. Pat. No. 5,551,663 (hereafter "the '663 patent") described the use of plastic molds in the manufacture of ophthalmic lenses, but no mention of successfully making lenses is included here. This approach necessitated the use of a "protective coating" first being applied to the mold before the mold could be used. This protective coating became a permanent part of the mold, and allowed for the mold to be used repeatedly. Evidence of the permanence of the coating is apparent in the description of the adhesion test used to assure proper adhesion of the coating to the mold. The patent describes a "plastic mold having an adherent, abrasion resistant, release enhancing face." The purpose of the coating of the '663 patent is to prevent attack of the mold by the lens material. (By comparison, this current patent application applies a coating to the mold, but with the intent that the coating be only temporary, and that it transfer via chemical or physical bonding to the lens material.)

The method of the '663 patent raises significant issues about its ability to consistently produce high-quality molded lenses. Possible problems that might occur with the method of the '663 patent include a decay in the optical quality of the mold. Any defect on either side of the mold could affect the finished quality of the lens. The decay can take the form of yellowing, cracking, scratching, and physical deformation. These forms of decay can occur with repeated use of a non-rigid material. Any of these types of decay could alter the optical quality of lenses made. Additionally, plastic materials would be difficult to clean, since they are not very chemically resistant, not scratch resistant, and not very resistant to the heat used in many typical processes.

Accordingly, a need exists for durable, low cost plastic molds that can be used to create lenses of various powers.

SUMMARY OF THE INVENTION

The present invention comprises a method and apparatus for casting a lens, and chemical compositions used to perform the same.

In one implementation of the invention, a front mold and a rear mold formed of a plastic are joined together or interconnected via a ring to form a mold cavity having substantially the same dimensions of the lens to be cast. Stated differently, surfaces of the ring and front and rear molds collectively define a volume known as the mold cavity, which is a negative image of the lens to be formed therein.

More specifically, the front mold has a lens-forming surface and an edge circumscribing the lens-forming surface. The rear mold similarly has a lens-forming surface and an edge circumscribing its lens-forming surface. The lens-forming surfaces of the front and rear molds are each of a size to be complementarily received by and within the interior periphery of the ring. The molds have backing members, which stop the insertion of molds when their respective lens-forming surfaces reach a predetermined point within the ring so that the spacing between the two lens-forming surfaces is at a desired separation distance. This desired separation corresponds to the thickness of the mold cavity, which dictates the thickness and power of the lens formed by the casting device.

The molds of the present invention may be designed to cast lenses of different strengths and curvatures. That is, for a lens with given optical surfaces, the lens thickness can be altered by manufacturing the front and/or rear molds having their backing member at one of a plurality of distances from the respective lens-forming surface. Alternatively, the length or height of the ring may be changed to vary the thickness of the mold cavity. Another alternative is to include a plurality of protrusions adjacent the edge of one of the lens forming surfaces, in which the height of the protrusions establishes the edge thickness of the mold cavity.

The present invention additionally allows for a disposable plastic mold to be used in the ophthalmic casting process, either with the disclosed apparatus or in other systems known in the art. This disposable mold can be made out of a variety of amorphous thermoplastics, and can be used to make a lens with or without a variety of coating scenarios.

The lenses formed using this process are impact resistant, can have any refractive index, can be clear (no tint) or photochromic, and can be used for "dress" or safety purposes.

DETAILED DESCRIPTION OF THE INVENTION

The present invention is more particularly described in the following detailed description, including examples. These examples are intended as illustrative of the invention, and numerous modifications and variations therein will be apparent to those skilled in the art while staying within the scope of the invention. As used in the specification and in the claims, "a," "an," or "the" can mean one or more, depending upon the context in which it is used.

A first embodiment is now described with reference to the figures, in which like numbers indicate like parts throughout the figures. The present invention comprises a molding or casting device 10 and an associated method that may be used to form lenses of various powers and geometric shapes, such as spectacle lenses. The present invention additionally comprises methods for making ophthalmic lenses using disposable plastic molds.

In this discussion, first one exemplary embodiment of a casting system comprising plastic components is discussed in the context of the components and method of those components. This first discussion provides context for and is followed by the aspects of the present invention that involve casting ophthalmic lenses using plastic molds. This latter discussion is not intended to be limited to the exemplary embodiment of the casting system disclosed herein.

Lens Casting Devices

Referring now to FIGS. 1-5, the casting device 10 of the present invention includes a front mold 20 and a rear mold 40, both of which are preferably formed of plastic. The casting device 10 also includes a ring 50, which may also be referred to as a sleeve or gasket. The ring 50 is also preferably formed of plastic and has opposed ends 52, an interior periphery 54, and an exterior periphery 56. As discussed below, portions of the front and rear molds 20, 40 are complementarily received by and into the interior periphery 54 to form a mold cavity 60.

Figure 1:
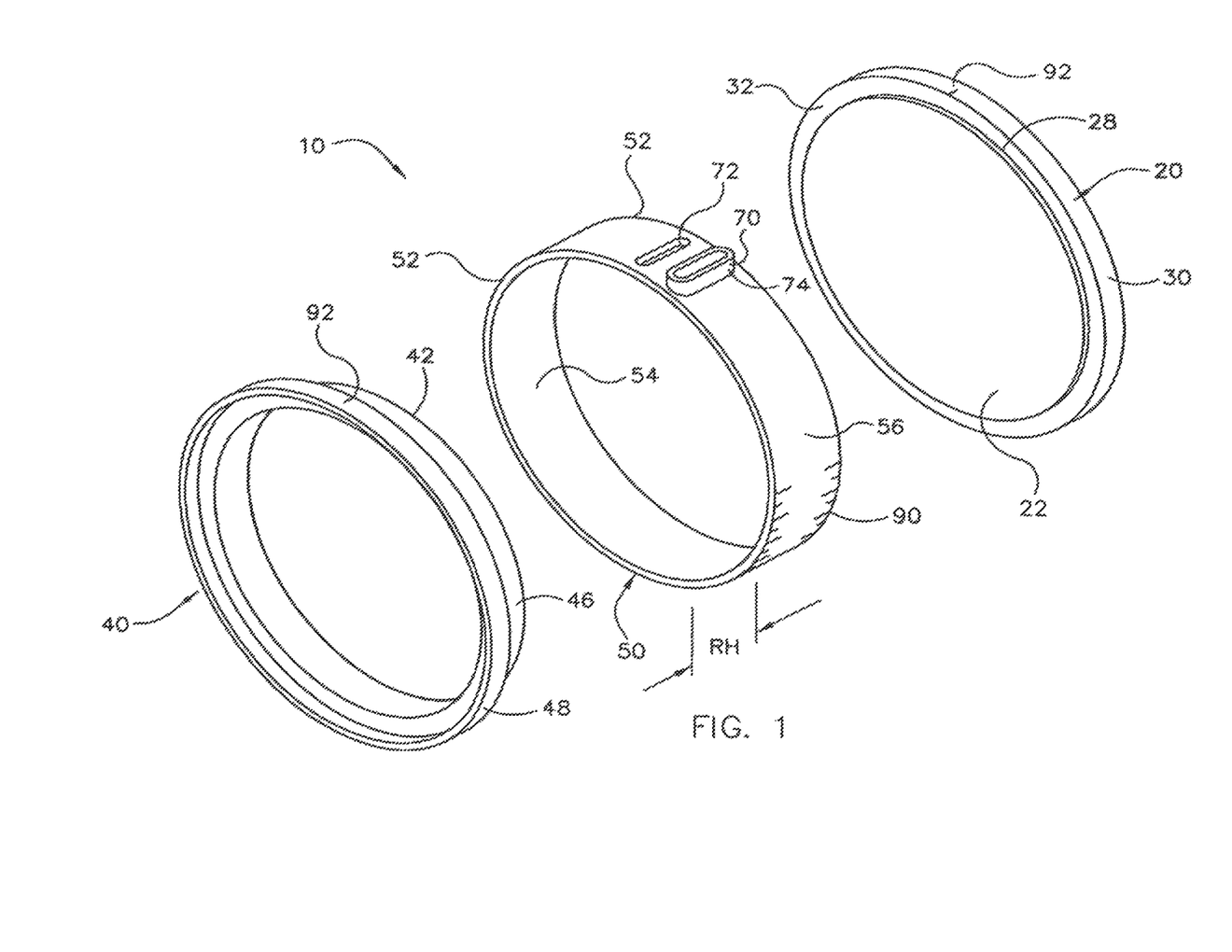
FIG. 1 is an exploded perspective view of an exemplary embodiment of a casting system used with the present invention.

The front mold 20 has a lens-forming surface 22, an edge 28 circumscribing the lens-forming surface 22, and a base 30 having dimensions greater than the interior periphery 54. The edge 28 circumscribing the lens-forming surface 22 is sized to be complementarily received within a portion of the interior periphery 54 of the ring 50 and preferably form a substantially liquid-tight seal therebetween. The edge 28 is slidably received within the interior periphery 54 of the ring 50 until the base 30 abuts the end 52 into which the edge 28 was inserted.

The rear mold 40 likewise has a lens-forming surface 42, a rim 46 circumscribing the lens-forming surface 42, and a flange 48 having dimensions greater than the interior periphery 54 of the ring 50. The rim 46 is also sized to be complementarily received within the interior periphery 54 of the ring 50, which occurs until the end 52 of the ring 50 abuts the flange 48. The rim 46 and the interior periphery 54 also preferably form a substantially liquid-tight seal therebetween.

Figure 3A:
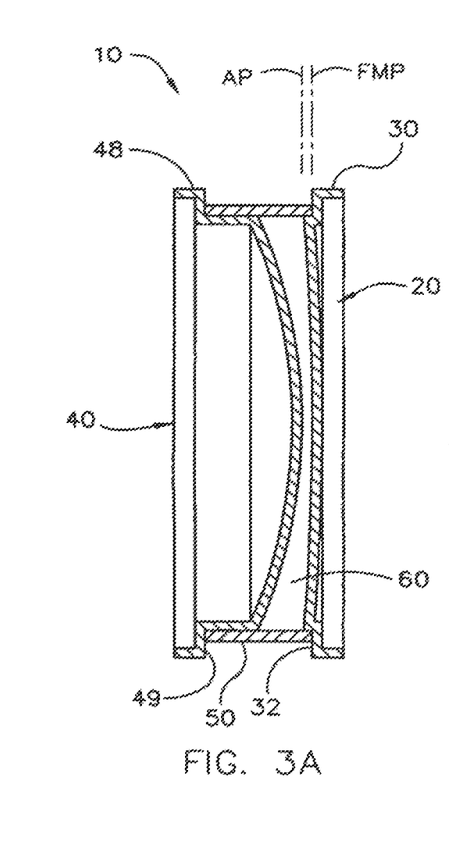
FIG. 3A is a side cross-sectional view of the components in FIG. 1 assembled.
Figure 3B:
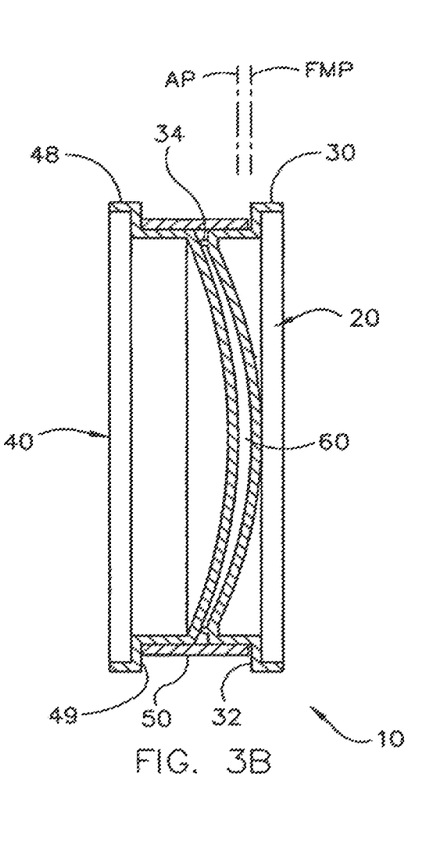
FIG. 3B is an alternative design of the casting system shown in FIG. 3A, in which the front mold of FIG. 2B is included.
Figure 4A:
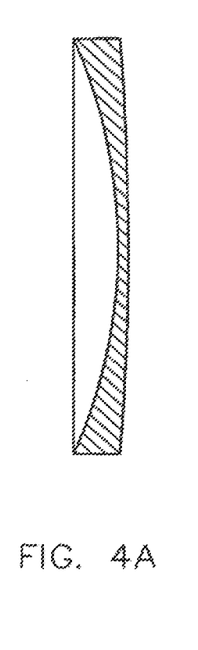
FIG. 4A is a lens formed by the casting system shown in FIG. 3A.
Figure 4B:
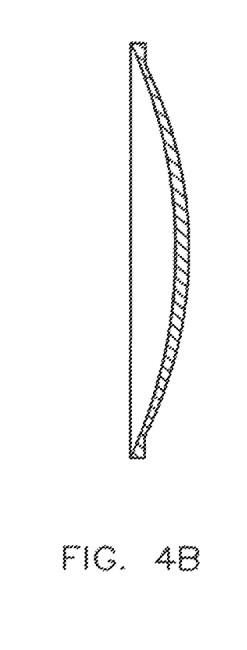
FIG. 4B is a lens formed by the casting system shown in FIG. 3B.

As shown in FIGS. 3A and 3B, when the edge 28 of the front mold 20 and the rim 46 of the rear mold 40 are both received by the respective ends of the ring 50, the lens-forming surfaces 22, 42 of the front and rear molds 20, 40 and the ring 50 form a mold cavity 60 which has dimensions of a desired lens formable therein. That is, the mold cavity 60 is a replica image of the lens to be formed and has a volume defined by the ring 50, front mold 20, and rear mold 40.

Figure 5:
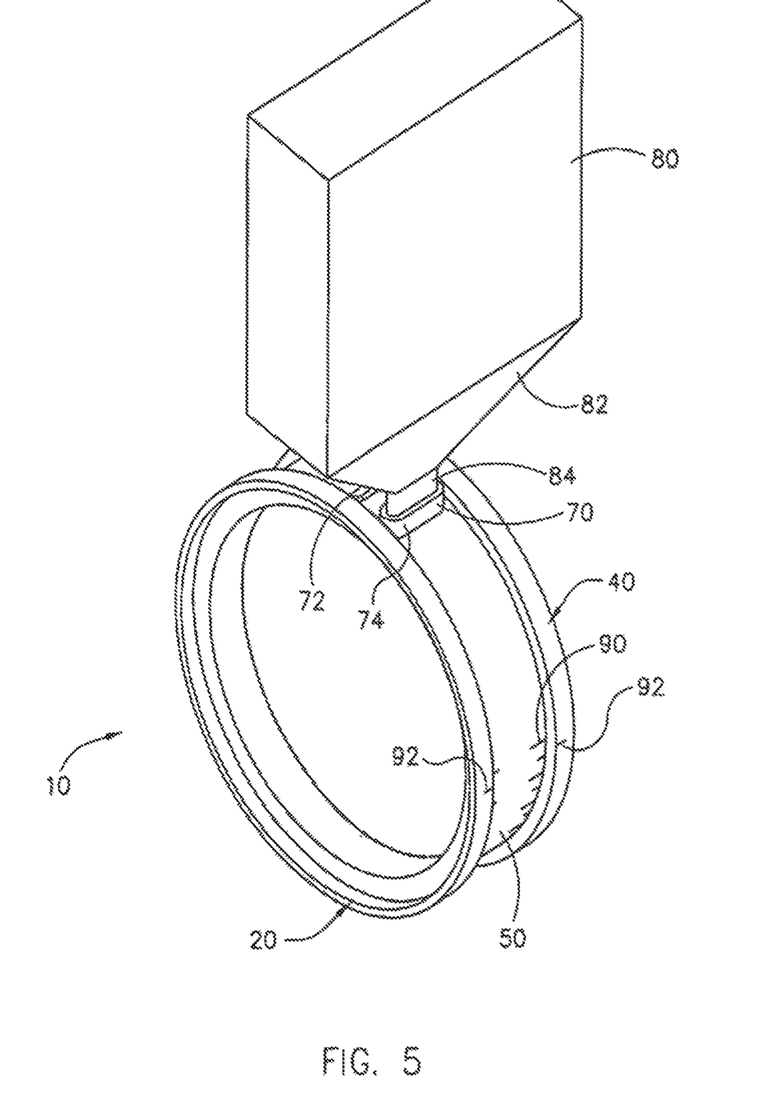
FIG. 5 is a perspective view of the casting system of FIG. 1 connected to a fill bag containing monomer.

To form a lens once the ring 50 and front and rear molds 20, 40 are properly joined or positioned together, a resin, such as a monomer or other lens-forming fluid, is added or injected into the mold cavity 60 and cured. To that end, the ring 50 defines a feed opening 70 and a vent opening 72 therethrough, which are shown in FIGS. 1 and 5. The vent opening 72 provides fluid communication from the mold cavity 60 to outside of it (i.e., to ambient).

As best shown in FIGS. 1 and 5, when the front and rear molds 20, 40 are disposed upright, then the mold cavity 60 is substantially circular in plan view and the vent opening 72 is positioned at approximately the top center (the 12:00 o'clock position). The feed opening 70 is preferably offset from the vent opening 72, and one contemplated range for this offset is by approximately fifteen to sixty degrees (15°-60°). Still referring to FIGS. 1 and 5, it will be noted that an extender 74 is joined to the feed opening 70. The top of the extender in communication with the feed opening 70 and is elevationally above the vent opening 72, which ensures that the cavity is full when the monomer reaches the top of the extender 74. It will further be noted that preferably the feed opening 70 is an elongated slot that extends across the width of the ring 50. This design ensures that communication exists with the mold cavity 60 through the feed opening 70 regardless of the placement of the molds relative to the ring, which may change when used for casting minus lenses verses plus lenses.

A key dimension of the formed mold cavity 60 is its thickness. For minus lenses used for nearsightedness or myopia shown for example in FIG. 4A, the center thickness is an important parameter, and it must satisfy impact testing required in the United States. As an example, plastic lenses formed of CR39 (which includes methyl-methacrylate—a thermoplastic resin better known by its trademark "Plexiglas"® or "Perspex"®—and diallyl glycol carbonate) must have a center thickness of at least two millimeters (2 mm). The preferred embodiment of the present invention is designed to be able to form both plus and minus lenses that satisfy these respective criteria.

Figure 2A:
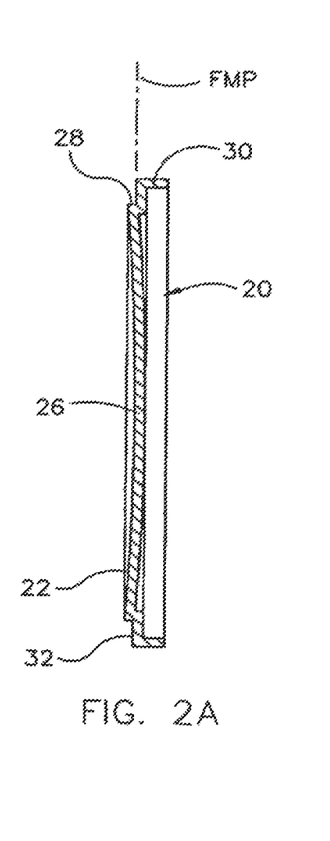
FIG. 2A is side cross-sectional view of the front mold shown in FIG. 1, which is preferably used to form a minus lens.

First with regard to minus lenses, the center thickness is obtained by the design of the front and rear molds 20, 40 in conjunction with the width or length of the ring 50. Referring now to FIG. 2A and addressing the front mold 20, its base 30 has a contacting surface 32 that is substantially planar, and that contacting surface 32 abuts one end 52 of the ring 50 when the edge 28 of the front mold 20 is inserted therein to define a portion of the mold cavity 60. In conjunction, the lens-forming surface 22 of the front mold 20 is concave and defines a nadir 26 or low point, which tangentially intersects a plane FMP defined by the contacting surface 32 of the base 30. The nadir 26 of the lens-forming surface 22 is thus at the same relative height as the contacting surface 32 when the front mold 20 is horizontally disposed. As such, the nadir 26 is aligned with the end of the ring 50 when the contacting surface 32 abuts the end 52 of the ring 50.

Figure 2B:
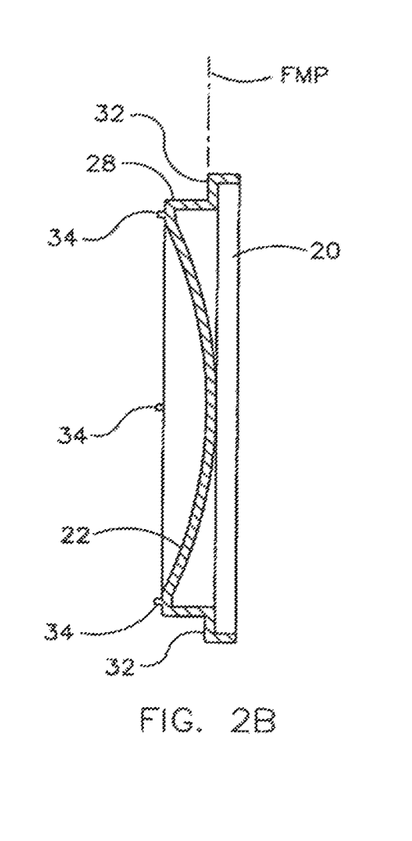
FIG. 2B is an alternative design of the front mold shown in FIG. 2A, which is preferably used to form a plus lens.
Figure 2C:
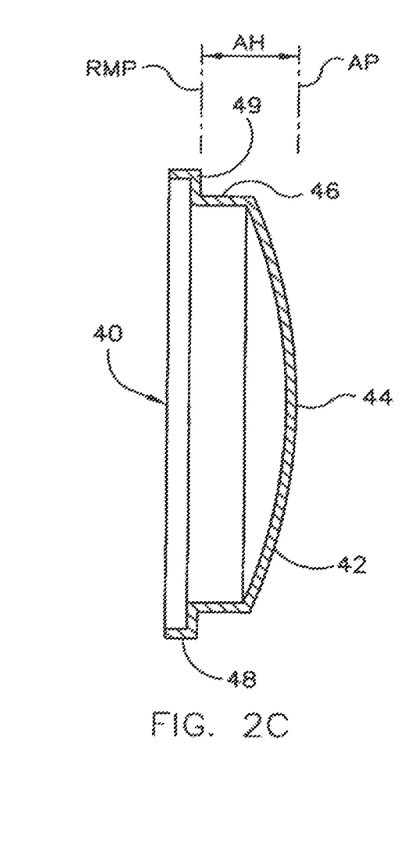
FIG. 2C is side cross-sectional view of the rear mold shown in FIG. 1.

As shown in FIG. 2C, the flange 48 of the rear mold 40 has an engaging surface 49 that is substantially planar to abut the respective end 52 of the ring 50 when the mold cavity 60 is formed. The lens-forming surface 42 of the rear mold 40 has an apex 44, in which a plane AP tangential to the apex 44 is substantially parallel to and spaced apart from a plane RMP defined by the engaging surface 49. The separation or distance between the plane AP tangential to the apex 44 and the plane RMP defined by the engaging surface 49 is called the back mold apex height AH.

Also, the opposed ends 52 of the ring 50 are spaced apart by a ring height RH. As one skilled in the art appreciates, the ring height RH establishes the separation between the engaging surface 49 of the rear mold 40 and the contacting surface 32 of the front mold 20. Correspondingly, the ring height RH is a parameter used to set the center thickness of the mold cavity 60, and thus the lens formed therein. That is, for this embodiment, the center thickness of the mold cavity 60 equals the ring height RH minus the back mold apex height AH, as the nadir 26 of the lens-forming surface 22 of the front mold 20 is aligned with one end of the ring 50. Thus, if the ring height RH is three millimeters (3 mm) and the back mold apex height AH is two millimeters (2 mm), then the center thickness—the separation between the apex 44 of the rear mold 40 and the nadir 26 of the front mold 20—is one millimeter (1 mm).

As shown in FIG. 3A, the assembled casting device 10 shows the relative position of the components in establishing the center thickness for the mold cavity 60. Specifically, one end 52 of the ring 50 abuts the contacting surface 32 of the front mold 20 and the opposed end 52 abuts the engaging surface 49 of the rear mold 40. The nadir 26 of the front lens-forming surface 22 is spaced apart a desired distance—the center thickness—from the apex 44 of the rear lens-forming surface 42 when the molds 20, 40 are coupled together. Stated differently, the plane AP tangential to the apex 44 is spaced apart from the plane FMP defined by the contacting surface 32 and tangentially intersects the nadir 26 at a distance substantially equivalent to the desired center thickness of the mold cavity 60. Thus, the apex 44 and the nadir 26 of the respective lens-forming surfaces 22, 42 in the mold cavity 60 are spaced apart at the desired center thickness for the lens to be formed.

As one skilled in the art appreciates, changing the dimensions of the components correspondingly alters the center thickness of the mold cavity 60. Any of the components can be modified. Although viable, currently the least desirable option is to change the position of the nadir 26 relative to contacting surface 32 of the front mold 20. A more desirable option is using rings 50 each having a different ring height RH to change the center thickness. The presently preferred design, however, is to vary the back mold apex height AH among different molds to change the center thickness of the mold cavity 60. Thus, in this latter design, the front mold 20 uses the same design shown in the illustrated embodiment and a "universal" or "one-size" ring that has the same dimensions regardless of the strength of the lens to be made; only the rear mold 40 is changed in this latter design and, in particular, the back mold apex height AH is altered among different rear molds 40 to vary the center thickness of the mold cavity 60.

Still another contemplated embodiment to change the center thickness for a selected ring 50, front and rear mold 20, 40 is to include a circular spacer (not shown) between the engaging surface 49 of the rear mold 40 and respective end of the ring 50. The circular spacer has diameter the same as the ring 50 and a fixed width or height, thereby increasing the center thickness of the mold cavity 60 by that width of the circular spacer. For example, a circular spacer having a width of one millimeter (1 mm) disposed between the end of the ring 50 and the engaging surface 49 would correspondingly result in the center thickness of the mold cavity 60—and lens to be formed therein—increasing by one millimeter (1 mm). Circular spacers, accordingly, may reduce the number of components that need to be manufactured to enable an operator to cast all desired dimensions and strength of lenses.

Referring now to FIGS. 2B and 3B, the illustrated front mold 20 includes a plurality of protrusions 34 located adjacent the edge and space apart from each other. The protrusions 34 have a height corresponding to a desired edge thickness for the mold cavity 60. For example, if the protrusions 34 have a height of one millimeter (1 mm), then the edge thickness of mold cavity 60 will be at least one millimeter because the protrusions 34 prevent the edges of the front and rear lens-forming surfaces 22, 42 from being closer together than the height of the protrusions 34. The protrusions 34 may be any desired height, including for example 0.75, 1.0, 1.25 millimeters and the like. A person skilled in the art can determine the number of protrusions 34 to use; the currently contemplated embodiment uses thirty-two equally spaced protrusions 34 circumscribing the perimeter of the lens-forming surface 22 of the front mold 20. Fewer protrusions are shown in the drawings for simplicity. It will be appreciated that benefits of this design include the same rear molds 40 and rings 50 that are used to form the minus lenses also being used to form the plus lenses.

The present invention additionally contemplates other methods of forming plus lenses. For example, the ring height RH may be varied to obtain the correct separation between the lens-forming surfaces 22, 42 of the front and rear molds 20, 40, including the edge thickness. Also, the lens-forming surfaces 42 of the rear molds 40 may include the protrusions 34 instead of the front molds, but this option is less desirable given the greater variations in rear mold designs and associated higher cost for a "library" of molds to manufacture all lens variations.

In addition to considering the edge of center thickness, another relevant parameter in forming a desired lens is the geometric configuration or relationship of its two optical surfaces. When the two lens-forming surfaces 22, 42 are both spherical, the molds 20, 40 do not require any special rotational alignment relative to each other. This is because the respective surfaces have a constant radius along their different axes resulting in the surfaces being symmetric relative to each other.

For other lenses, however, the present invention includes a means for orienting the front and rear molds 20, 40 at a predetermined rotational position with respect to each other. In the illustrated embodiment, the front and rear molds 20, 40 are rotatably movable relative to each other so that the two molds may be positioned at one of a plurality of selected relative rotational orientations. This orienting means thus allows the operator to alter the dimensions or shape of the mold cavity 60 to desired values when either or both of the lens-forming surfaces 22, 42 of the front and rear molds 20, 40 have asymmetric curvature. Examples of asymmetrical lenses that operators may typically cast include the front surface of a lens being spherical with an add power—or less frequently being a plano surface—and, in conjunction or independently, the back surface being cylindrical or toric. A discussion of the features and types of such asymmetrical surfaces may be found in U.S. Pat. No. 6,103,148.

Referring back to FIG. 1, the present invention also comprises an aligning means to allow the operator to appreciate the relative rotation of the two molds 20, 40 and position them accordingly. The aligning means shown in the illustrated embodiment comprises axis marks 90 on the exterior periphery 56 of the ring 50 and an axis-positioning indicator 92 on the front mold 20 or rear mold 40 or both. The axis marks 90 extend from 0° to 180° and the asymmetrical lens-forming surface 22 or 42 is to be positioned in registry with them. If injection molding or similar technique forms the components, the aligning means are preferably etched or formed into the respective dies. Thus, the position indicator 92 and marks 90 are also integrally formed into the components. One skilled in the art will also appreciate that aligning means may alternatively comprise the axis marks being located on one or both of the front and rear molds 20, 40 and an axis-positioning indicator on the ring 50. Other methods of visually indicating the rotational position of the molds relative to each other may also be used.

In preparing to cast the lens, the operator locates the position indicator 92 at a desired orientation relative to the axis marks 90 on the ring 50 either before the front and rear molds 20, 40 are joined to the ring 50 or afterwards (e.g., twisting the molds relative to each other once they are coupled to the ring 50). The operator, thus, is able to position the two molds at a desired rotational location easily using the aligning means.

When the operator joins the ring 50 and the two molds 20, 40 together after selecting them, it is preferred that a connecting means exists so that the components do not inadvertently separate during the lens casting process. Such a connecting means can take numerous forms known in the art, including the interior periphery 54 of the ring 50 and the edge 28/rim 46 having a tight frictional fit. Other connecting means are also contemplated (not shown), including designs in which the two molds 20, 40 snap into place within the ring 50 or in which an external clip or containing device is used to hold the components together.

In still another contemplated embodiment, the front and rear molds 20, 40 are formed as a single unit so they are integrally joined to each other. This may occur during the forming process (i.e., during injection molding) so that the operator receives a preformed molding structure in which the front and rear molds 20, 40 are stationarily positioned relative to each other. This unitary design, however, has less flexibility than interchanging the ring 50 and the front and rear molds 20, 40.

As noted above, once the front and rear molds 20, 40 are stationarily positioned together, a resin, such as a monomer or other lens-forming fluid, is added or injected into the mold cavity 60 and cured via the feed and vent openings 70, 72 through the ring 50. Referring now to FIG. 5, a fill bag 80 or the like containing a fluid such as monomer may be interconnected to the feed opening 70 or its extender 74. More specifically, the fill bag 80 has an interior and an injection port 82 detachably connectable to the feed opening 70. When the injection port 82 is linked to the feed opening 70, the monomer located within the interior of the fill bag 80 may flow through the port into the mold cavity 60.

The injection port 82 and the feed opening 70 are preferably designed to complementarily engage each other. That is, the tip 84 of the injection port 82 is of a size to be complementarily received within the feed opening 70 or its extender 74 to form a fluid-tight seal therebetween.

One consideration that a person skilled in the art takes into account in casting lenses is the flow characteristics of the monomer traversing from the fill bag 80 into the mold cavity 60. A primary concern is to avoid the introduction of air bubbles and ensure that any such bubbles escape from of the mold cavity 60 before the curing begins; otherwise, the formed lens may be unacceptable if an air bubble discontinuity exists in the final product. In addressing this issue, the size of the feed opening 70 should be of a dimension and positioned to promote laminar flow when filling the mold cavity 60. The fill opening 70 is preferably oriented to direct the monomer along the side of the mold cavity 60 during the initial filling. As noted above, the vent opening 72 is also preferably located at the top of the mold cavity 60 (i.e., at the 12:00 o'clock position) to vent air within the cavity 60 when displaced by the injected or incoming monomer. The vent opening 72 being located at the top also allows any bubbles to escape before the curing process begins.

Another consideration regarding injecting monomer involves positioning the mold cavity 60 so that the add power (not shown) is oriented to have its flat top portion substantially upright or vertical during filling the mold cavity 60. This orientation assists in preventing air bubbles within the monomer from being trapped by this discontinuity in the lens-forming surface 22 of the front mold 20. Bubbles are more likely to remain in the mold cavity 60 if, for example, the flat top is horizontally oriented.

Referring again to FIG. 5, the fill bag 80 is at least partially constructed of a deformable surface on which the operator directs a compressive force so that one wall of the bag 80 moves inwardly toward the opposed wall. When that compressive force is applied, the fluid monomer located within the interior is forced toward and out of the injection port 82 to enter the mold cavity 60 via the feed opening 70. In constructing a system necessitating minimal capital investment, the illustrated embodiment is inexpensively designed and relies on the operator hand squeezing the bag 80 to fill the mold cavity 60.

Other means of injecting monomer into the mold cavity 60 are contemplated. Examples of such systems using a deformable bag to fill the mold cavity 60—particularly for more complex casting design—is disclosed in U.S. patent application Ser. No. 10/095,130, filed on Mar. 11, 2002 and entitled "Method and Apparatus for Dispensing a Fluid". Monomer fill systems similar to the design disclosed in U.S. Pat. No. 6,103,148 is another option.

Once monomer fills the mold cavity 60, the bag 80 is separated from the mold and then the monomer is cured (as discussed in more detail below).

Mold Materials

Materials suitable for forming the molds of the invention include a variety of thermoplastic or substantially thermoplastic materials that can be injection molded. The materials are preferably optically transparent. Suitable amorphous thermoplastic materials include, but are not limited to, polycarbonate, acrylics, polystyrene, CAB (cellulose acetate butyrate), polyesters, and combinations thereof. In general it is also desirable that the thermoplastic material be selected such that it will not be attacked by coating and/or monomer material used to form the lens. In general higher molecular weight analogs are desirable because they are typically more resistant to coatings and monomers used to form the lenses.

Amorphous thermoplastics can provide the advantage that, unlike crystalline thermoplastics, they tend to maintain an optical-quality surface for long periods of time, and so have a long shelf life with proper storage. In contrast, crystalline thermoplastics such as polypropylene, undergo dimensional changes after they are injection molded. These dimensional changes occur due to the polymer's attempt to arrange itself in a more crystalline structure. The result of this rearrangement is that the plastic part can have an uneven, non-optical surface. In contrast, amorphous thermoplastics will typically retain the shape they took on during the injection molding process. Not all thermoplastics are either 100% crystalline or 100% amorphous, so the scope of this disclosure ranges from "substantially amorphous" to totally amorphous materials, meaning thermoplastics that contain mostly amorphous materials.

The present invention is directed, in part, to a disposable mold for creating an ophthalmic lens. The disposable mold can include a substantially amorphous thermoplastic material forming an optically precise surface. The mold can also include a coating in direct contact with the optically precise surface, the coating configured to be incorporated into an ophthalmic lens and further configured removable from the mold. Suitable substantially amorphous thermoplastic materials include acrylic, polycarbonate, polystyrene, polyester, polyamide, cellulose acetate butyrate, and combinations thereof.

It is generally desirable that the amorphous thermoplastic mold retain its dimensional stability and optical surface quality after formation of the mold. Also, in some implementations the amorphous thermoplastic material includes a mixture of an amorphous material and a crystalline material. The thermoplastic material will typically have a glass transition temperature above the curing temperature of lens casting material used to form a lens.

Depending upon the material used to form the lens itself, it is often desirable to have the thermoplastic material be substantially transparent to radiation between wavelengths of 250 and 600 nm, allowing various radiation-initiated curing processes to be used to make the lenses.

Typically the mold material does not contain a plasticizer, or contains very little plasticizer. One problem with plasticizers is that they can cause imperfections in the mold surface. Thus, any plasticizer that is present should be at low enough levels so that it does not alter the optical surface of the mold. In addition, it is desirable that any plasticizer does not cause premature release of the lens material or coating material and it does not inhibit the cure of the lens or the coating. Also, certain plasticizers can gradually bleed out of a mold material and onto the surface of the mold. This is problematic, because it can destroy the optical surface either by creating an uneven surface or by integrating itself with the lens-forming composition. Thus, any plasticizer should not alter the useable shelf life of the coated or uncoated molds.

Mold Coatings

In certain embodiments of the invention a coating is applied to the interior of the mold prior to forming the lens. In some embodiments the coating is applied to interior portions of the mold by dip coating, spin coating, spray coating, flow coating, electrostatic spray, roll coating, modified roll coating, print coating, or other coating method. The coating may then optionally also be subjected to a "precure" to partially cure the coating so that it will stay in place and not move during subsequent steps in the process.

In some embodiments the invention includes disposable molds comprising a substantially amorphous thermoplastic material forming an optically precise surface containing less than an operable quantity of a mold release agent or plasticizer where less than an operable quantity means that the component does not interfere with curing of the coating or lens monomer formulation, or compromise the optical surface of the mold or lens formed therefrom. Thus, the mold can be substantially free of external or internal plasticizers; said plasticizers defined as a material that is chemically different from the thermoplastic material.

The invention also includes disposable molds for forming an ophthalmic lens wherein the mold includes a substantially amorphous thermoplastic material forming an optically precise surface; and a coating in contact with the optically precise surface of the mold, the coating configured to be incorporated into an ophthalmic lens and removable from the mold.

The molds can be coated with any of a variety of coating formulations, provided that the coating does not chemically attack the mold. The coating formula can include, for example, acrylate functional materials capable of crosslinking, initiators or catalysts capable of initiating the reaction of acrylates, flow or leveling agents, defoamers, stabilizers, UV absorbers, antioxidants, dyes, and possibly solvents. Some solvents can be used in the coating formulation, as long as such formulations do not substantially attack the mold before the formulation has cured. Solvents that could be used would include alcohols, glycols ethers, etc. Solvents that would be less acceptable for use would include lower molecular weight ketones such as acetone, methyl ethyl ketone, methyl isobutyl ketone (MIBK), cyclohexanone; acetates; aromatic solvents such as benzene, xylenes; low MW hydrocarbons such as hexane, etc.

Suitable coatings include those that provide a hardcoat for improved scratch-resistance, a tintable coat for the purpose of making sunglasses or other "fashion" tints, a UV coat to prevent certain wavelengths of UV light to pass through the lens, an AR ("anti-reflective") coat to prevent glare, or any other type of ophthalmic coating. The coating should be selected so that it does not attack the mold material. Such coatings remain on the mold temporarily and are transferred to the finished lens during the lens curing step. Thus, the coating is applied to the mold with the intent that it becomes an integral part of the finished lens.

In general it is important that the coating not attack the interior of the mold and be readily releasable from the mold. Accordingly, coating formulations should not have enough solvating power to attack the mold. The coating preferentially has a more complete cure at the mold/coating interface than at the coating/air interface.

The use of a less than operable quantity of mold release agent may be used in conjunction with the coating. For example, the less than operable quantity of mold release agent and the coating may be separate from each other. Alternatively, the less than operable quantity of mold release agent and the coating may be a single component. That is, the less than operable quantity of mold release agent and the coating may be separate formulations or an integral (i.e. a single) formulation.

In addition to the use of a less than operable quantity of mold release agent, it is contemplated that embodiments of the invention may be free or substantially free of a mold release agent. That is, embodiments of the invention may be implemented without using any mold release agent. For example, a curable composition used to form the molds may be free of a mold release agent. The coating materials that may be applied to the molds, if any, may be free of a mold release agent, the materials used to form the optical lens may be free of a mold release agent. Thus, in this exemplary embodiment, a mold release agent is not applied in any form during the lens manufacturing process.

Lens Forming Formulations

The molds of the present invention are suitable for use with a variety of resin compositions to form finished optical lenses. In general, molds made in accordance with the invention are well suited to use a radiation-initiated curing process, such as by exposure to ultraviolet or visible light, but can also include thermally cured materials if the thermal cure temperature is below the glass transition temperature $T_g$ of the mold.

By way of example and not limitation, suitable lens forming compositions include materials having low cure temperatures (i.e., polymerization exotherms), which cure quickly, including acrylates, methacrylates, and styrenes. In some implementations epoxies can be used.

It is generally desirable to have the lens forming formulation be inert or substantially inert to the mold itself. However, in certain circumstances the lens material is not inert to the mold material, in which case an intermediate coating material can be used to prevent degradation of the mold. Typically the coating is applied first to the interior of the mold, cured or partially cured, and then the primary lens forming formulation is added.

Any of a variety of photocleavable or thermal initiators can be used. The level of photo initiator or thermal initiator used is typically low (less than 5%) and would not have a significant impact on the chemical aggressiveness of the lens formulation on the mold. In general, lower temperature curing of the lens is preferred, accomplished with UV or visible light photo initiators, low initiation temperature thermal initiators or a combination of both. A variety of light sources can be used, including those with output in the UV-A range, UV-B range visible range, or combinations thereof.

Depending on the choice of thermoplastic materials used, there will be certain chemistries and/or process parameters that will allow the mold to be used satisfactorily. Based on the simple chemical notion that "like dissolves like," each different type of thermoplastic material can be used without issue with certain ingredients typical of a coating formulation and/or lens formulation. In order to determine if a raw material (or group of raw materials in a formulation) will be chemically compatible with mold material, any number of tests can be employed:

One screening test for chemical compatibility involves a representative sample of the thermoplastic material to be placed in close contact with the chemical to be tested. This "close contact" can involve soaking the thermoplastic in the test solution, or the test solution can be allowed to sit on top of the thermoplastic material. The time and temperature during which the two materials are in contact are controlled variables in the test. After the test period is over, all excess test solution is removed from the thermoplastic material by simple wiping, and the thermoplastic is evaluated for any damage by measuring any change in physical appearance, any change in percent transmittance, any change in refractive index, any change in tensile strength, any change in flexibility, any change in weight or size, any change in surface smoothness, or any change in optical properties.

In certain embodiments of the invention, the formulation used to form the lenses and the material used to form the mold is selected based upon solubility properties of the mold material and the lens forming formulation. Although it is difficult to determine solubility of a solid material in a resin, the durability of the mold can be used as an indication of solubility. Applicants have found that the lens forming formulation should be selected such that the resin does not significantly degrade optical properties of the mold surface upon exposure to the resin. In general it is desirable to have low solubility of the mold material in the lens forming formulation.

Any significant change in any of the above properties of the thermoplastic constitutes damage to the material, and the thermoplastic material cannot be used with that test solution. However, it is still quite possible that although a certain ingredient is known to attack a particular thermoplastic material, that ingredient can still be used in small amounts in solution, provided that the other components are compatible with the thermoplastic. Numerous examples of such scenarios are provided for in this patent.

Methods for Casting and Curing Lenses

The present invention is also directed to methods for casting lenses. For an initial step, the method of the present invention involves providing the ring 50 and front and rear molds 20, 40. Although it is contemplated that the components be pre-connected together as a unit and provided to the operator, it is preferred that the ring 50 and front and rear molds 20, 40 are preferably combined or coupled together by the operator at the lens manufacturing location to form the mold cavity 60. When the operator receives the prescription of a spectacle lens, he or she selects the front and rear molds 20, 40 that, together, form a mold cavity 60 having the dimensions of the desired lens. In the illustrated embodiment, the ring is a "one-size" or "universal" ring and used to manufacture all lenses, whether plus or minus and regardless of power.

To that end, the ring 50 and front and rear molds 20, 40 are movable between a stored position and a molding position. In the stored position, the components are separated from each other, in which molds having the same characteristics are stored together in designated areas or bins. In the molding position, the protrusion 46 of the rear mold 40 receives the edge 28 of the front mold 20 to form the mold cavity 60 after the operator retrieves the correct molds from the designated storage areas.

It is contemplated using computer or other system (not shown) to assist the operator in selecting the correct molds 20, 40 when preparing to cast a lens. As one example, the present invention contemplates that the operator enters the parameters of the lens to be formed (e.g., the prescription including add power) into a computer or the like. Algorithms in an associated computer program determine the appropriate front and rear molds 20, 40 to be used to form the desired lens and then provide an output indicating this information. As one optional variation, such a system may additionally illuminate a light or provide another indicator at the storage stations above the specific location where the appropriate molds 20, 40 are stored. The indicators assist the operator in locating the appropriate molds to reduce the chance of the operator inadvertently picking an incorrect mold to make the lens. Yet another option is to use a bar code or other tracking system (not shown) on the outer surfaces of the molds 20, 40 that the system scans to verify that the two proper molds are being used.

After the operator locates the front and rear molds 20, 40, obtains a ring 50, and is ready to join the components together, the output of the optional computer system may further assist the operator by indicating additional positioning and aligning information. As discussed above, in the illustrated embodiment the front and rear molds 20 are rotatably movable relative to each other so that the two molds 20, 40 are at one of a plurality of selected rotational orientations relative to each other. The computer may provide an output indicating the orientation of the two molds 20, 40 relative to each other when the lens-forming surfaces 22, 42 of the respective molds have asymmetric curvature. For the illustrated embodiment, the computer preferably indicates the appropriate location of the axis-positioning indicator 92 to be aligned on the axis marks 90.

As to the positioning of the molds 20, 40 to obtain the correct center or edge thickness for the mold cavity 60, this parameter is preferably considered in selecting the ring 50 and molds 20, 40, as discussed above. The designated components are preferably manufactured so that when the operator combines or assembles the components together, the mold cavity 60 has the correct thickness without any additional actions.

However, one skilled in the art will appreciate that other means besides a computer system may be used to determine the correct mold to use with the present invention. Notably the present invention utilizing the computer system allows an operator with minimal training and understanding of the principles of lens casting to manufacture successfully lenses when a customer provides a prescription.

After the front and rear molds 20, 40 are joined with the ring 50 to form the mold cavity 60 of the desired dimensions, the operator connects the bag 80 or other source of monomer to the feed opening 70. The operator then injects the monomer into the mold cavity 60.

During filling, the monomer enters via the feed opening 70 while the vent opening 72 allows displaced air to exit the mold cavity 60 to ambient. The filling method used with the present invention minimizes the quantity of monomer wasted and decreases the chances of air bubbles being formed within the lens. If used, the bag 80 may contain a quantity of monomer that is sufficient to form only a single lens or, alternatively, for multiple castings.

Because monomer is a viscous fluid, it will inherently fill the mold cavity 60 at a controlled rate. By design, the fill rate may be further controlled by reducing the cross-sectional area of the feed opening 70 and/or the tip 84 of the bag 80. Since the front and rear molds 20, 40 are formed of plastic, they can be clear or transparent so that the operator may visually observe the monomer entering and filling the mold cavity 60. When the cavity 60 is filled with monomer so that the monomer reaches the vent opening 72 (and thus the top of the extender of the feed opening 70), the monomer source is removed from the ring 50. If necessary, the feed opening 70 is plugged, which may simply involve spot curing the monomer at that location to plug it or using a covering that snaps into the feed opening 70. The vent opening 72, however, preferably remains in communication with ambient during curing.

The monomer within the mold cavity 60 is then cured to form the lens after ensuring that no bubbles are present. The lens material, depending on the formulation, can be cured with a variety of methods, including light, heat, or combinations thereof. If a free-radical mechanism is employed, then the lens can be cured via either UV light, visible light, or heat, depending on the initiator. It is also possible to cure the lens with a combination of these curing techniques. These curing methods can be used either simultaneously or sequentially.

Both curing techniques can be used with a variable rate of cure (i.e., ramp-up, progressive cure.) After the cure cycle is complete (typically from two to ten minutes) the lens is removed from the molds simply be removing the gasket, and lifting the molds away from the lens.

Methods of Making Lenses Using Plastic Molds

The present invention is also directed to methods of casting lenses using plastic molds, which may be used with the exemplary embodiment discussed immediately above or another design (i.e., a T-gasket design that uses plastic molds instead of glass molds). The method can include providing a substantially amorphous thermoplastic material injection molded to form a mold having an optically precise surface, plus providing a first curable composition suitable for forming an ophthalmic lens, said first curable composition being unreactive or reactive with the amorphous thermoplastic material used to form the mold. A second curable composition is also provided, this second curable composition is a curable coating and compatible with the amorphous thermoplastic material used to form the mold. The optically precise surface of the lens mold is coated with the second curable composition such that the second curable composition is in direct contact with the substantially amorphous thermoplastic material, and at least partially curing the second curable composition to form an at least partially cured coating. Subsequently, a lens is formed within the lens mold by applying the first curable coating composition over the at least partially cured coating, and substantially curing the first curable coating composition at temperatures below 50° C. Thereafter, the cured lens is from the mold such that the at least partially cured coating is removed with the lens and is secured to the cured first curable composition.

When selecting the specific type of material to form the molds, one skilled in the art will appreciate that to be useful in curing monomer, the selected plastic must transmit the curing radiation without melting, deforming, or stretching—at least until after the monomer is substantially cured or polymerized. Although thermal radiation is contemplated as a curing source and falls within the scope of the present invention, one skilled in the art will appreciate that the present invention may be better suited for photo curing.

For photo curing of liquid resins, the desirable plastics include acrylic and methacrylic materials, an example of which is polymethylmethacrylate (PMMA). Some embodiments of available light transmissive PMMA are the OP1 and OP4 products by Cyro Industries, UV-T and V8-25 by Rohm & Haas, and CP-75 from ICI. Other exemplary types of radiation transmissive plastics that may be used with the present invention include aliphatic polyesters, amorphous polyamides, amorphous polyurethanes, amorphous polyolefins, amorphous polycarbonates, amorphous polyimides and co-polymers thereof. One skilled in the art will appreciate that these listed plastics are illustrative and the present invention is not limited to these examples.

Another factor that one skilled in the art considers in selecting the plastics to use is that they do not adversely interface or react with the material to be cured. If, for example, it is desired to use polymethylmethacrylate to form the molds based on its cost or physical properties, then compatible monomers include long chain or high molecular weight monomers or prepolymers that do not attack the mold should be used. Alternatively, the monomer desired to be used may be the primary consideration and the plastic forming the molds is chosen based on it being chemically resistant and non-reactive to that selected monomer.

Using plastic to form the molds provides potential benefits over casting systems currently used in the industry. One consideration is that the plastics may be injection molded. There is extensive use and experience in the industry of injection molding polymethylmethacrylate and acrylics using ceramic or metal molds. To that end, the molds may be formed, for example, by fabricating metal dies into which polymethylmethacrylate or other plastic is injection molded in an assembly process having a high throughput. Each of the molds, accordingly, will be formed to the same high tolerances to which the die is formed. Glass molds, in contrast, cannot be fabricated to such exacting standards, so the present invention can cast an ophthalmic lens that is formed to more rigorous criteria. One skilled in the art will further appreciate that the plastic components may be formed using other suitable high throughput methods used in the art for fabricating plastics, in contrast to glass molds that cannot feasibly be mass-produced to the requisite tolerances.

Another consideration with using plastic components is the economic comparison with conventional prior art systems using two glass molds and a gasket. Although glass molds may be repeatedly used up to one hundred times or more, expenses accumulate that are associated with each casting, such as washing and drying that must ensure that the lens-forming surface is not contaminated. In fact, cleaning processes for glass molds are typically laborious, time-consuming and inefficient, involving manual scraping and soaking in noxious solvents. Furthermore, the glass molds must be inspected after each use and cleaned to insure suitability for another lens-making cycle. Plus, many times the glass molds are inadvertently chipped and/or broken before their potential useful life is reached. An associated problem is the occurrence of lens yield loss resulting from unwitting reuse of damaged lens molds, in which the operator sometimes does not discover that a glass mold is damaged until after a casting process has been completed.

Yet another aspect of the present invention involves coating the lens-forming surfaces of the molds with an abrasion-resistant composition that is transferred to the lens when cured. More specifically, the lens-forming surfaces are preferably covered with a composition that transfers in situ to the optical surfaces of the cast lens as a protective coating on the final product. Without such a hard coating on the lens that prevents or resists abrasion, scratching, and marring, the optical quality of the cast spectacle lenses may more easily degrade from haze and poor image quality.

Another example of such an abrasion-resistant coating is disclosed in U.S. Pat. No. 5,049,321. This patent discloses that the coating composition consists substantially of reactants having at least triacrylate functionality, a photoinitiator, and a polymerization inhibitor reactive with oxygen. After applying such a coating composition in the form of an ultraviolet curable liquid to the mold, the coating is subjected to ultraviolet radiation in an oxygen-containing environment such that the coating composition is cured to a hard/abrasion-resistant state. Then, when casting and curing the ophthalmic lens, the monomer is permitted to harden and react with acrylate groups at the coating/lens interface so that the coated lens is removed from the mold with the abrasion-resistant coating adhering thereto as an integral part of the surface of the optical surfaces of the lens. Other similar techniques of forming an abrasion-resistant coating on a cast lens are disclosed in U.S. Pat. Nos. 4,338,269 and 4,758,448.

One skilled in the art will appreciate that, although not necessary, using such an abrasion-resistant coating on the lens-forming surfaces produces a final product that consumers may prefer and that also allows the operator to separate more easily the molds from the lens cast therebetween. To that end, the abrasion-resistant coating may be applied to the lens-forming surfaces of the molds using a process the same as or similar to that disclosed in U.S. patent application Ser. No. 10/075,637, filed on Feb. 12, 2002 and entitled "Methods of Applying a Coating to an Optical Surface". Alternative treatment methods of the molds known in the art include spraying, dipping, brushing, flow coating, spin coating, and the like.

The preferred method involves curing using photo curing, although other curing methods are contemplated in conjunction with or alternatively to light. One primary advantage of photo curing, such as UV radiation, is that the plastic molds do not reach a temperature at which they may melt, deform, or stretch, which is more likely to occur with thermal radiation curing. UV curing methodologies are taught, for example, in U.S. Pat. Nos. 4,919,850; 5,524,419; 5,804,107; 5,981,618; 6,103,148; and 6,241,505.

After the monomer is cured to harden, then the operator removes the cured lens from within the mold cavity. It is contemplated that the plastic components of the present invention will have a one-use life. That is, the molds can be disposable so that there are no problems if the molds are chipped or broken during the removal of the lens from the mold cavity. In fact, breaking the molds may assist in separating the cured lens from the mold cavity 60, as the molds are more brittle than the cured lens so the lens does not also break. One skilled in the art will also appreciate that treating the lens-forming surfaces with abrasion-resistant coatings, such as the compositions disclosed in U.S. patent application Ser. No. 10/712,714 and U.S. Pat. No. 5,049,321, will assist in separating the lens from the mold as well as providing the lens with a protective scratch-resistant barrier. One skilled in the art will further appreciate that the plastic molds of the present invention can be used for more than one casting before their useful life ends.

EXAMPLES

The invention will now be further understood by reference to the following examples. As used in these examples, SR 340 is the monofunctional monomer 2-phenoxyethylmethacrylate; SR 506 is isobornyl acrylate; SR 150 is ethoxylated bisphenol A dimethacrylate; Ebecryl 1039, which is a urethane monoacrylate; Ebecryl 810, which is a polyester tetraacrylate; CN 131 is a low viscosity aromatic monoacrylate oligomer; and SR 203 is a tetrahydrofurfuryl methacrylate monofunctional cyclic monomer. All numbers below are in parts. The lenses were cured between two acrylic molds. The cure time was 5 minutes (except for the 100% SR 203 formulation, which was cured for 30 minutes). The formulations were photocured.

Examples 1 to 3: Lens Formation Interaction

These examples show how diluting an aggressive formulation component with a non-aggressive component can modify the mold-formulation interaction.

Example 1

The molds for Example 1 were formed of uncoated acrylic. As can be seen from Table 1, the use of a mixture containing more of the less aggressive component (SR 150) than the aggressive component (SR 340) resulted in less lens damage. Lens damage means the lens was not optically acceptable. One type of observed lens damage is when a portion of the mold is stuck on the lens after de-molding.

TABLE 1

|  | Formulation | | | | | | |
| --- | --- | --- | --- | --- | --- | --- | --- |
|  | 1 | 2 | 3 | 4 | 5 | 6 | 7 |
| SR 150 | 100 | 90 | 85 | 80 | 70 | 50 | 0 |
| SR 340 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (minor) | Yes (Light) | Yes (Heavy) |

Example 2

The molds for Example 2 were formed of uncoated acrylic. As can be seen from Table 2, the use of a mixture containing more of the less aggressive component (SR 150) than the aggressive component (CN 131) had less lens damage.

TABLE 2

|  | Formulation | | | | | | |
| --- | --- | --- | --- | --- | --- | --- | --- |
|  | 1 | 2 | 3 | 4 | 5 | 6 | 7 |
| SR 150 | 100 | 90 | 85 | 80 | 70 | 50 | 0 |
| CN 131 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (Minor) | Yes (Light) | Yes (Heavy) |

Example 3

The molds for Example 3 were formed of uncoated acrylic. As can be seen from Table 3, the use of a mixture containing more of the less aggressive component (SR 150) than the aggressive component (SR 203) had less lens damage.

TABLE 3

|  | Formulation | | | | | | |
| --- | --- | --- | --- | --- | --- | --- | --- |
|  | 1 | 2 | 3 | 4 | 5 | 6 | 7 |
| SR 150 | 100 | 90 | 85 | 80 | 70 | 50 | 0 |
| SR 203 | 0 | 10 | 15 | 20 | 30 | 50 | 100 |
| Photo-initiator | 0.35 | 0.35 | 0.35 | 0.35 | 0.35 | 0.35 | 0.35 |
| Lens Damage | No | No | No | No | Yes (Minor) | Yes (Minor) | Yes (Heavy) |

Examples 4 to 6

Examples 4 to 6 below show the effect of temperature on curing various lens materials. As can be seen, increasing the cure temperature to 50° C. can result in a damaged lens, and sometimes to a milky lens.

Example 4

The molds for Example 4 were formed of uncoated acrylic. As can be seen from Table 4, the higher temperatures at which the lenses were cast resulted in more lens and/or mold damage and haze formation.

TABLE 4

| | Formulation | | | | | |
|---|---|---|---|---|---|---|
| | 1 | 2 | 3 | 4 | 5 | 6 |
| Temperature | Room temp. | 50° C. | Room temp. | 50° C. | Room temp. | 50° C. |
| SR 150 | 100 | 100 | 80 | 80 | 50 | 50 |
| SR 340 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/Yes | No/No | Yes/Yes |

Example 5

The molds for Example 5 were formed of uncoated acrylic. As can be seen from Table 5, the higher temperatures at which the lenses were cast resulted in more lens and/or mold damage and haze formation.

TABLE 5

| | Formulation | | | | | |
|---|---|---|---|---|---|---|
| | 1 | 2 | 3 | 4 | 5 | 6 |
| Temperature | Room temp. | 50° C. | Room temp. | 50° C. | Room temp. | 50° C. |
| SR 150 | 100 | 100 | 80 | 80 | 50 | 50 |
| CN 131 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/No | Yes/No | Yes/Yes |

Example 6

The molds for Example 6 were formed of uncoated acrylic. As can be seen from Table 6, the higher temperatures at which the lenses were cast resulted in more lens and/or mold damage and haze formation.

TABLE 6

| | Formulation | | | | | |
|---|---|---|---|---|---|---|
| | 1 | 2 | 3 | 4 | 5 | 6 |
| Temperature | Room temp. | 50° C. | Room temp. | 50° C. | Room temp. | 50° C. |
| SR 150 | 100 | 100 | 80 | 80 | 50 | 50 |
| SR 203 | 0 | 0 | 20 | 20 | 50 | 50 |
| Photo-initiator | 0.35 | 0.35 | 0.35 | 0.35 | 0.35 | 0.35 |
| Lens Damage/Haze | No/No | No/No | No/No | Yes/Yes | No/No | Yes/Yes |

Example 7

The molds for Example 7 were formed of acrylic. Example 7 shows lens damage comparing coated molds and uncoated molds. Table 7 exhibits the potential advantages of coating the molds prior to filling with formulation and subsequent curing.

TABLE 7

| | Formulation | | | |
|---|---|---|---|---|
| | 1 | 1 | 2 | 2 |
| Mold Coated | No | Yes | No | Yes |
| Temperature | Room Temp. | Room Temp. | 50° C. | 50° C. |
| SR 150 | 0 | 0 | 80 | 80 |
| SR 340 | 100 | 100 | 20 | 20 |
| Photo-initiator | 0.35 | 0.35 | 0.35 | 0.35 |
| Damage/Haze | Yes/No | No/No | Yes/Yes | No/No |

Examples 8 to 10

Examples 8 to 10 provide mold-formulation interaction data for molds made from a variety of polymers. The following information can be ascertained from the examples: First, different mold materials behave differently. In addition, coating the molds suitably can help prevent mold and lens formulation interaction, and minimizing the time the lens formulations are in contact with the molds prior to cure is an advantage. The lower the mold and lens formulation temperature is, prior to and during cure, the less likely mold-formulation interaction is to occur. Finally, under suitable conditions it is possible to cure and successfully separate molds and formulations without pre-coating the molds. [For tables 8, 9, and 10, only the test material is listed. The remainder of the formulation in these examples consists of SR-150 and photoinitiator(s). In Examples 8-10, "No" means there was no lens damage as defined in Example 1, "Yes" means lens damage was observed.]

Example 8

Example 8 shows temperature and time as factors in lens manufacture, using acrylic molds.

TABLE 8

| % Material | Temp. | Time | Ebecryl 1039 | | SR 340 | | CN 131 | | Ebecryl 810 | |
|---|---|---|---|---|---|---|---|---|---|---|
| | | | Coated | Uncoated | Coated | Uncoated | Coated | Uncoated | Coated | Uncoated |
| 0 | RT | 10 Min. | No | No | No | No | No | No | No | No |
| | | 30 Min. | No | No | No | No | No | No | No | No |
| | | 60 Min. | No | No | No | No | No | No | No | No |
| 10 | RT | 10 Min. | No | No | No | No | No | No | No | No |
| | | 30 Min. | No | No | No | No | No | No | No | No |
| | | 60 Min. | No | No | No | No | No | No | No | No |
| 30 | RT | 10 Min. | No | No | No | No | No | No | No | No |
| | | 30 Min. | No | No | No | No | No | No | No | Yes |
| | | 60 Min. | No | No | No | No | No | No | No | Yes |
| 50 | RT | 10 Min. | No | No | No | No | No | Yes | No | Yes |
| | | 30 Min. | No | No | No | No | No | Yes | No | Yes |
| | | 60 Min. | No | No | No | No | No | Yes | No | Yes |
| 100 | RT | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |
| 0 | 50° C. | 10 Min. | No | No | No | No | No | No | No | No |
| | | 30 Min. | No | No | No | No | No | No | No | No |
| | | 60 Min. | No | No | No | No | No | No | No | No |
| 10 | 50° C. | 10 Min. | No | Yes | No | Yes | No | No | No | No |
| | | 30 Min. | No | Yes | No | Yes | No | No | No | No |
| | | 60 Min. | No | Yes | No | Yes | No | No | No | No |
| 30 | 50° C. | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |
| 50 | 50° C. | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |
| 100 | 50° C. | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |

Example 9

Example 9 shows temperature and time as factors in lens manufacture, using polystyrene molds.

TABLE 9

| % Material | Temp. | Time | Ebecryl 1039 | | SR 340 | | CN 131 | | Ebecryl 810 | |
|---|---|---|---|---|---|---|---|---|---|---|
| | | | Coated | Uncoated | Coated | Uncoated | Coated | Uncoated | Coated | Uncoated |
| 0 | RT | 10 Min. | No | No | No | No | No | No | No | No |
| | | 30 Min. | No | Yes | No | Yes | No | Yes | No | Yes |
| | | 60 Min. | No | Yes | No | Yes | No | Yes | No | Yes |
| 10 | RT | 10 Min. | No | No | No | Yes | No | Yes | No | No |
| | | 30 Min. | No | Yes | No | Yes | No | Yes | No | Yes |
| | | 60 Min. | No | Yes | No | Yes | No | Yes | No | Yes |
| 30 | RT | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |
| 50 | RT | 10 Min. | No | Yes | No | Yes | No | Yes | No | Yes |
| | | 30 Min. | No | Yes | No | Yes | No | Yes | No | Yes |
| | | 60 Min. | No | Yes | No | Yes | No | Yes | No | Yes |
| 100 | RT | 10 Min. | Yes | Yes | Yes | Yes | No | Yes | No | Yes |
| | | 30 Min. | Yes | Yes | Yes | Yes | No | Yes | No | Yes |
| | | 60 Min. | Yes | Yes | Yes | Yes | No | Yes | No | Yes |

TABLE 9-continued

| % Material | Temp. | Time | Ebecryl 1039 Coated | Ebecryl 1039 Uncoated | SR 340 Coated | SR 340 Uncoated | CN 131 Coated | CN 131 Uncoated | Ebecryl 810 Coated | Ebecryl 810 Uncoated |
|---|---|---|---|---|---|---|---|---|---|---|
| 0 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 10 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 30 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 50 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | 50° C. | 10 Min. | Yes | Yes | Yes | Yes | No | Yes | No | Yes |
|  |  | 30 Min. | Yes | Yes | Yes | Yes | No | Yes | No | Yes |
|  |  | 60 Min. | Yes | Yes | Yes | Yes | No | Yes | No | Yes |

Example 10

Example 10 shows temperature and time as factors in lens manufacture, using polycarbonate molds.

TABLE 10

| % Material | Temp. | Time | Ebecryl 1039 Coated | Ebecryl 1039 Uncoated | SR 340 Coated | SR 340 Uncoated | SR 203 Coated | SR 203 Uncoated | SR 506 Coated | SR 506 Uncoated |
|---|---|---|---|---|---|---|---|---|---|---|
| 0 | RT | 10 Min. | No | No | No | No | No | No | No | No |
|  |  | 30 Min. | No | No | No | No | No | No | No | No |
|  |  | 60 Min. | No | No | No | No | No | No | No | No |
| 10 | RT | 10 Min. | No | No | No | No | No | No | No | No |
|  |  | 30 Min. | No | No | No | No | No | No | No | No |
|  |  | 60 Min. | No | No | No | No | No | No | No | No |
| 30 | RT | 10 Min. | No | No | No | No | No | Yes | No | No |
|  |  | 30 Min. | No | No | No | No | No | Yes | No | No |
|  |  | 60 Min. | No | Yes | No | Yes | No | Yes | No | Yes |
| 100 | RT | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No* | Yes* |
| 0 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 10 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 30 | 50° C. | 10 Min. | No | Yes | No | Yes | No | Yes | No | Yes |
|  |  | 30 Min. | No | Yes | No | Yes | No | Yes | No | Yes |
|  |  | 60 Min. | No | Yes | No | Yes | No | Yes | No | Yes |
| 100 | 50° C. | 10 Min. | No* | Yes* | No | Yes | No | Yes | No | Yes |
|  |  | 30 Min. | No* | Yes* | No | Yes | No | Yes | No* | Yes* |
|  |  | 60 Min. | No* | Yes* | No | Yes | No | Yes | No* | Yes* |

*During the hold period attack on the uncoated side caused it to leak. The coated side exhibited no evidence of attack.

Although the present invention has been described with reference to specific details of certain embodiments thereof, it is not intended that such details should be regarded as limitations upon the scope of the invention except as and to the extent that they are included in the accompanying claims.

Some references, which may include patents, patent applications and various publications, are cited and discussed above in the disclosure. The citation and/or discussion of such references is provided merely to clarify the description of the present invention and is not an admission that any such reference is "prior art" to the invention described herein. All references cited and discussed in the disclosure are incorporated herein by reference in their entireties and to the same extent as if each reference was individually incorporated by reference.

What is claimed is:

1. A method of forming an ophthalmic spectacle lens, the method comprising:
    providing a substantially amorphous thermoplastic material injection molded to form a disposable mold having an optically precise surface;
    providing a curable composition suitable for forming an ophthalmic lens, the curable composition being unreactive or reactive with the amorphous thermoplastic material used to form the mold;
    providing an acrylate functional curable coating, the curable coating being compatible with the amorphous thermoplastic material used to form the mold;

coating the optically precise surface of the mold with the curable coating that is configured to be transferrable to a lens and removable from the mold and partially curing the curable coating to form a partially cured acrylate functional coating such that the curable coating remains on the mold temporarily;

subsequently forming the lens within the mold by applying the curable composition over the partially cured acrylate functional coating, and substantially curing the partially cured coating and the curable composition by either UV light or visible light for less than 1 hour at temperatures below 50° C. such that the substantially cured coating is incorporated into the lens and removable from the mold; and removing the cured lens from the mold such that the substantially cured coating is removed with the lens and is secured to the cured curable composition and confers abrasion resistance to the lens, wherein the lens has a thickness of about 1-2 mm.

2. The method of claim 1, wherein the amorphous material is selected from the group consisting of acrylic, polycarbonate, polystyrene, polyester, polyamide, cellulose acetate butyrate, and combinations thereof.

3. The method of claim 1, wherein the curable coating is readily removable from the thermoplastic material after curing of the curable coating, but forms a strong bond to the first curable composition.

4. The method of claim 1, wherein the first curable composition and curable coating bond with each other during curing of the compositions.

5. The method of claim 1, wherein the mold has a light transmission of no less than 50 percent of light from wavelengths between 250 and 600 nm.

6. The method of claim 1, wherein the curable composition polymerization exotherm temperature is below 50° C. until after the curable composition is substantially cured.

7. A method of forming an ophthalmic spectacle lens, comprising:

providing front and rear molds, each mold defining an optically precise surface comprising an amorphous thermoplastic material selected from the group consisting of acrylic, polycarbonate, polystyrene, polyester, polyamide, and cellulose acetate butyrate;

providing a curable coating, the curable coating being compatible with, and not chemically attacking, the amorphous material used to form the mold, wherein the curable coating is configured to be transferrable to a lens and removable from the mold;

forming a partially cured coating in direct contact with the optically precise surface of at least one of the front and rear molds by applying the curable coating on the surface of at least one of the front and rear molds and partially curing the curable coating such that the partially cured coating remains on the mold temporarily;

providing a curable composition suitable for forming the lens;

forming a cured lens within the front and rear molds by applying the curable composition over the partially cured coating and curing the partially cured coating and the curable composition by either UV light or visible light for less than 1 hour such that the cured coating is incorporated into the lens and removable from the mold; and removing the cured lens from the front and rear molds such that the cured curable coating is removed with the cured lens and confers abrasion resistance thereto, wherein the lens has a thickness of about 1-2 mm.

8. The method of claim 7, wherein the curable coating comprises an acrylate functional material.

9. The method of claim 7, wherein the curable coating consists substantially of reactants having at least triacrylate functionality, a photoinitiator, and a polymerization inhibitor reactive with oxygen.

10. The method of claim 7, wherein the partially cured coating consists essentially of a partially cured acrylate functional material and an initiator or catalyst for initiating the reaction of the acrylate functional material.

* * * * *